(12) United States Patent
Pifher et al.

(10) Patent No.: US 9,228,541 B2
(45) Date of Patent: Jan. 5, 2016

(54) PARTIALLY SEALED FUEL VAPOR PURGE SYSTEM

(71) Applicant: Ford Global Technologies, LLC, Dearborn, MI (US)

(72) Inventors: Kenneth L. Pifher, Holly, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 13/762,080

(22) Filed: Feb. 7, 2013

(65) Prior Publication Data

US 2014/0216421 A1    Aug. 7, 2014

(51) Int. Cl.
*F02D 41/00* (2006.01)
*F02M 25/08* (2006.01)
*F02M 33/02* (2006.01)

(52) U.S. Cl.
CPC ....... *F02M 25/0854* (2013.01); *F02D 41/0032* (2013.01); *F02M 25/0818* (2013.01); *F02M 25/089* (2013.01)

(58) Field of Classification Search
CPC ............ F02M 25/0818; F02M 25/089; F02M 25/0872; F02M 25/0854; F02M 25/08; F02M 25/0809; F02M 25/0836; G01M 3/04; G01M 3/045; F02D 41/0032; F02D 41/004
USPC .......................................... 123/520, 518, 516
See application file for complete search history.

(56) References Cited

U.S. PATENT DOCUMENTS

| | | | | |
|---|---|---|---|---|
| 5,349,935 A | * | 9/1994 | Mezger et al. | 123/520 |
| 5,398,662 A | * | 3/1995 | Igarashi et al. | 123/520 |
| 5,562,083 A | * | 10/1996 | Osanai | 123/519 |
| 5,794,599 A | * | 8/1998 | Blumenstock | 123/519 |
| 5,954,034 A | * | 9/1999 | Takagi | 123/520 |
| 6,367,457 B1 | * | 4/2002 | Mancini et al. | 123/516 |
| 8,245,699 B2 | | 8/2012 | Peters et al. | |
| 8,273,164 B2 | * | 9/2012 | Makino et al. | 96/134 |
| 2003/0061864 A1 | * | 4/2003 | Wong et al. | 73/40 |
| 2003/0226549 A1 | * | 12/2003 | Takagi et al. | 123/520 |
| 2005/0139197 A1 | * | 6/2005 | Ohhashi et al. | 123/520 |
| 2009/0150041 A1 | * | 6/2009 | Hill et al. | 701/102 |
| 2010/0275888 A1 | * | 11/2010 | Yuen et al. | 123/520 |
| 2010/0288021 A1 | * | 11/2010 | Makino et al. | 73/40.7 |
| 2011/0168140 A1 | * | 7/2011 | DeBastos et al. | 123/521 |
| 2011/0295482 A1 | * | 12/2011 | Pearce et al. | 701/102 |
| 2012/0145133 A1 | * | 6/2012 | Takamatsu | 123/520 |
| 2012/0227580 A1 | * | 9/2012 | Dudar et al. | 95/19 |

\* cited by examiner

*Primary Examiner* — Lindsay Low
*Assistant Examiner* — George Jin
(74) *Attorney, Agent, or Firm* — James Dottavio; Alleman Hall McCoy Russell & Tuttle LLP

(57) ABSTRACT

Systems and methods for operating an engine with a fuel vapor recovery system are disclosed. In one example approach, a method comprises, during a diurnal condition, providing a first amount of venting to a fuel vapor canister, and during a purge condition, providing a second amount of venting to the fuel vapor canister, where the second amount is greater than the first amount.

19 Claims, 3 Drawing Sheets

PARTIALLY SEALED FUEL VAPOR PURGE SYSTEM

BACKGROUND/SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. Further, such evaporative emission control systems may be monitored during certain conditions to detect degradation of system components, such as leaks, for example.

The inventors herein have recognized that an increasing number of vehicle application are having issues with canister purge due to lower available engine vacuums, such as in stop/start and hybrid applications. Approaches are known which use a two way (open/closed) canister vent valve and an open venting system where the vent valve is in a normally open position during diurnal conditions, such as during refueling and other engine off conditions. The inventors herein have recognized that approaches which use a normally open canister vent valve, where the vent valve is positioned in a fully open position, during diurnal conditions may result in reduced vapor storage capacity and an increased an amount of vacuum needed to effectively purge the canister. Further, in some examples, such approaches may rely on fuel tank isolation valve to effectively monitor and purge the system which may increase costs.

In order to address these issues, in one example approach a method for an engine with a fuel vapor recovery system is provided. The method comprises, during a diurnal condition, providing a first amount of venting to a fuel vapor canister, and during a purge condition, providing a second amount of venting to the fuel vapor canister, where the second amount is greater than the first amount.

In this way, vapor generation in a fuel vapor recovery system may be reduced and vapor storage capacity of the canister may be more effectively utilized by restricting the canister fresh air vent during diurnal events. For example, by restricting the fresh air path at the canister vent during diurnal events and allowing the evaporative system to build positive pressure, vapor generation may be reduced and an increased amount of pressure may be available during purging and monitoring conditions without relying on costly valve systems. Also, by restricting the canister vent, vapor may be forced to travel over the canister bed at a slower rate allowing more residence time within the canister which allows the canister bed material to bond more vapor in the bed before reaching the atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
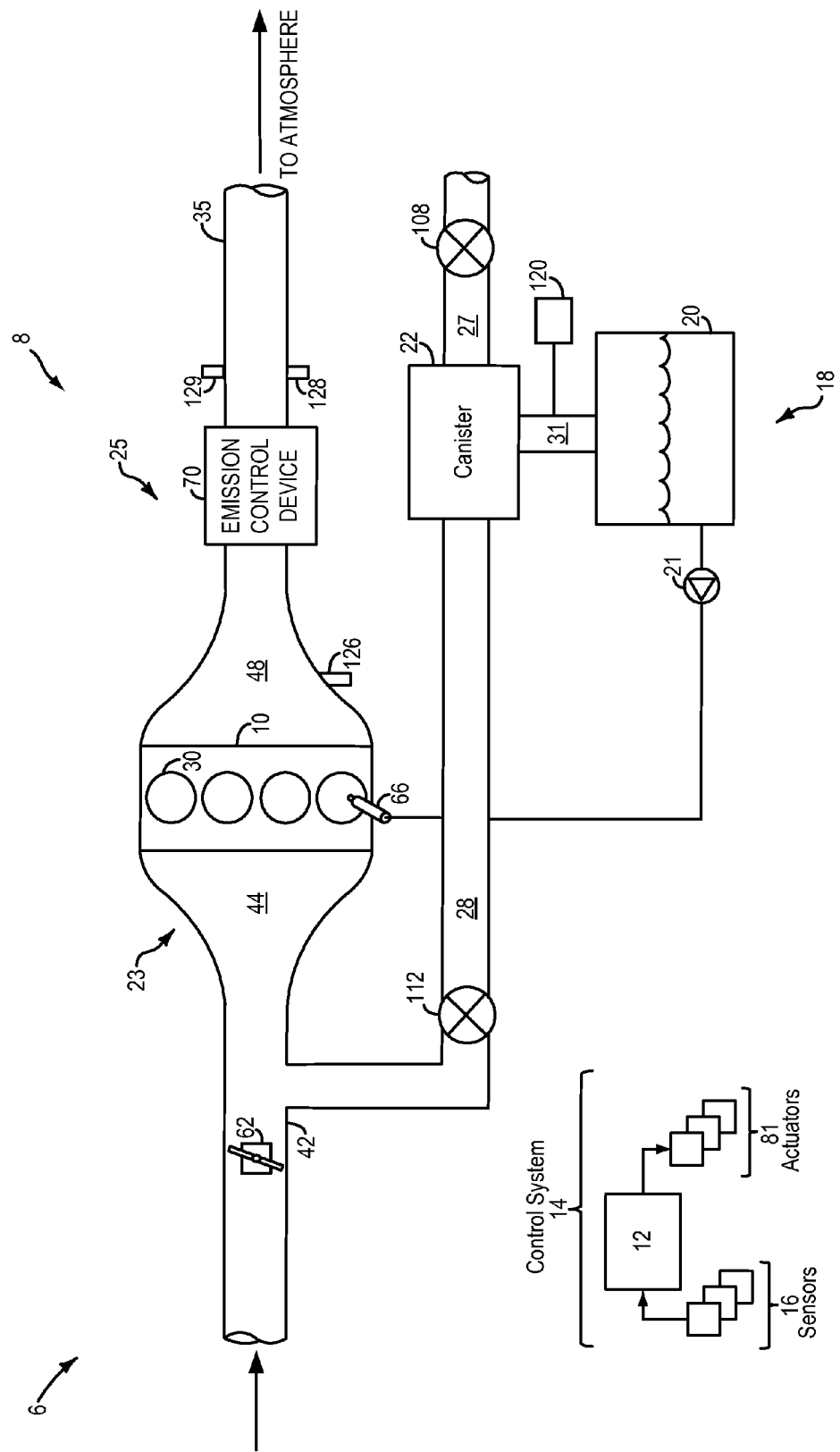
FIG. 1 shows a schematic depiction of an engine and an associated emissions control system.
Figure 2:
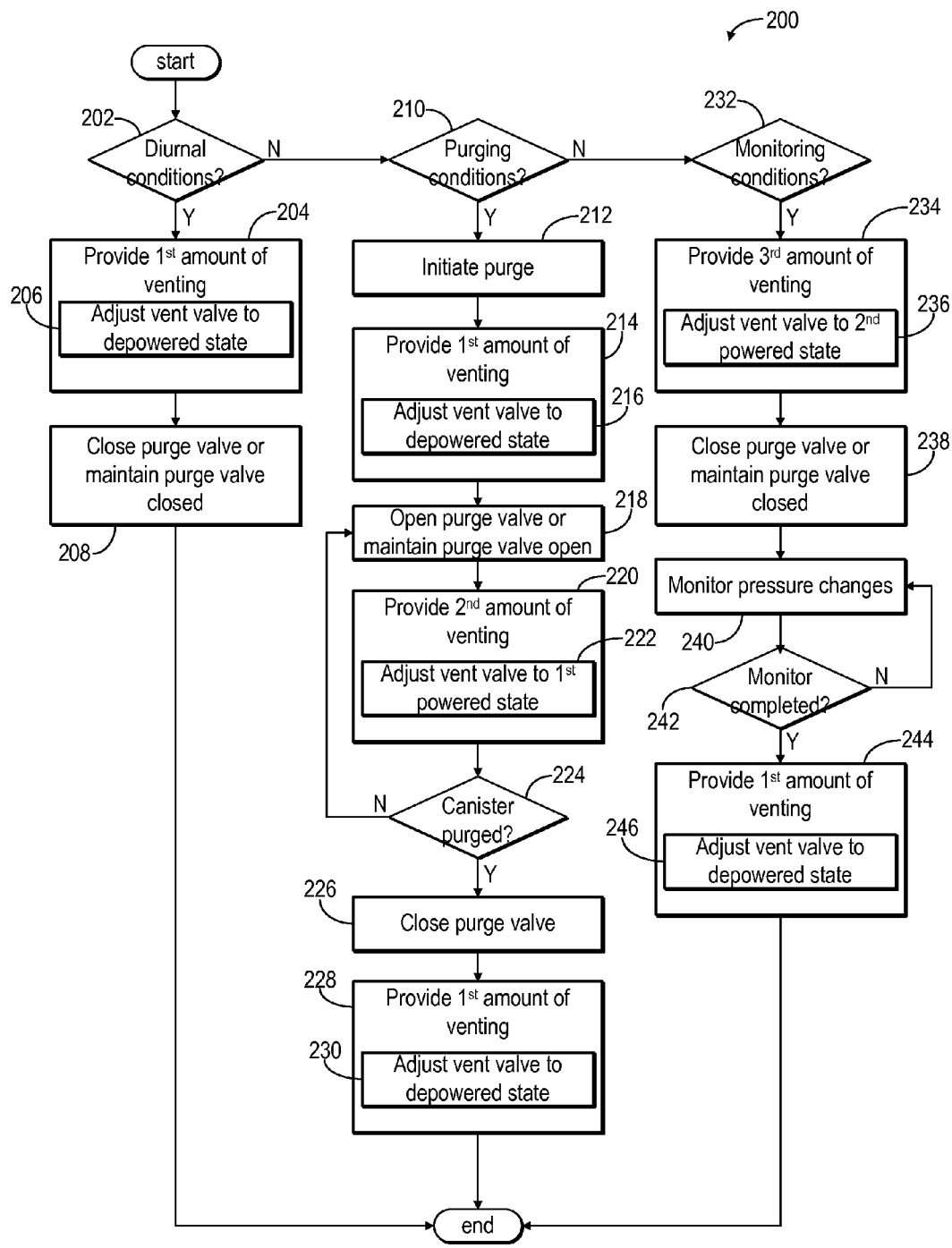
FIG. 2 shows an example method for operating an engine with a fuel vapor recovery system in accordance with the disclosure.
Figure 3:
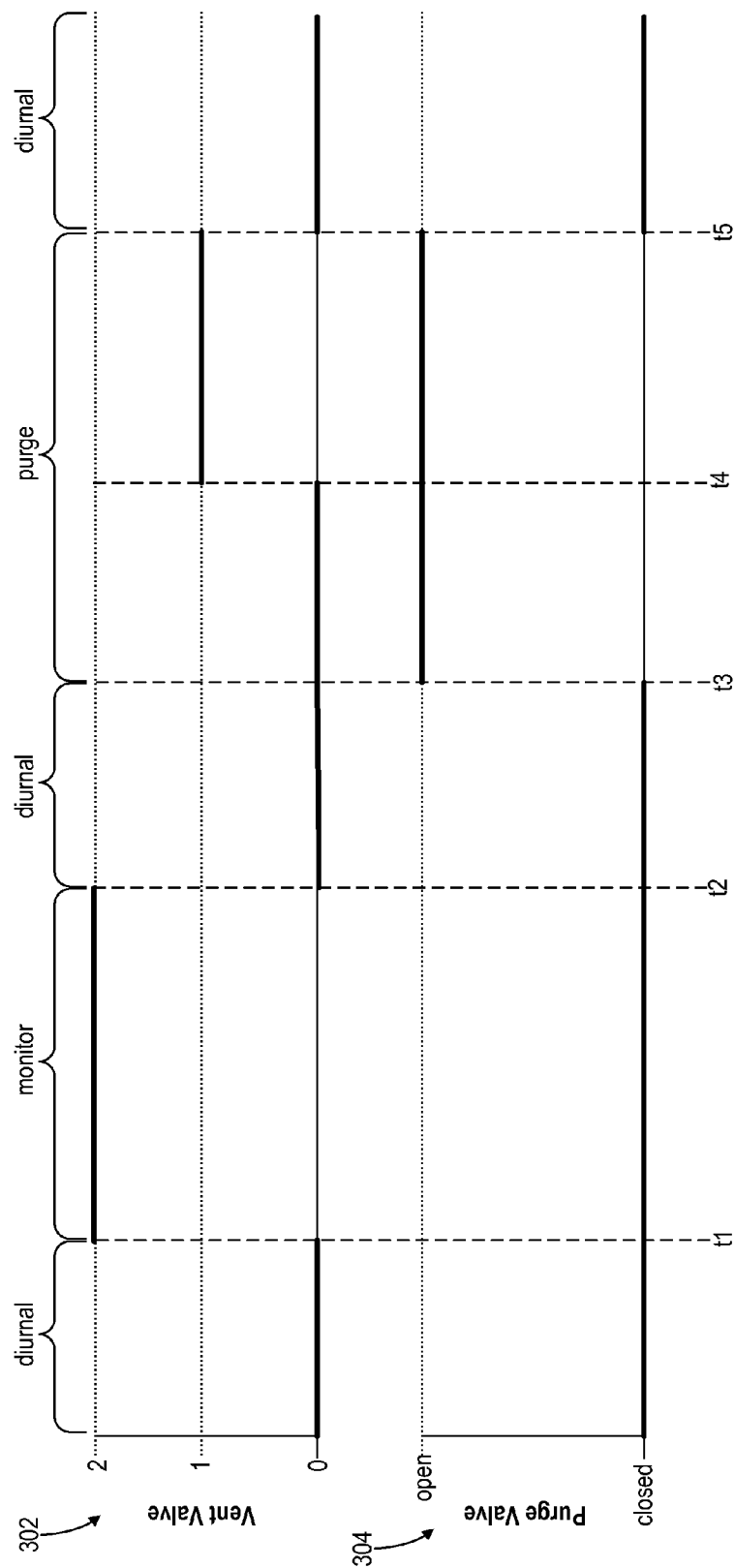
FIG. 3 shows example graphs of operating conditions of a vent valve and purge valve during various conditions in accordance with the disclosure.

The following description relates to systems and methods for operating an engine with a fuel vapor recovery system, such as the engine shown in FIG. 1. The fuel vapor recovery system may include a fuel vapor canister and a three-position canister vent valve which may be adjusted to provide varying amounts of venting to the fuel vapor canister during different conditions as shown in FIGS. 2 and 3.

FIG. 1 shows a schematic depiction of a vehicle system 6. In some examples, vehicle system 6 may be a hybrid vehicle system. The vehicle system 6 includes an engine system 8 coupled to an emissions control system 23 and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system. Vapors generated in fuel system 18 may be routed to a fuel vapor canister 22, via vapor recovery line 31, before being purged to the engine intake 23. Vapor recovery line 31 may optionally include a fuel tank isolation valve. Among other functions, fuel tank isolation valve may allow the fuel vapor canister to be maintained at a low pressure or vacuum without increasing the fuel evaporation rate from the tank (which would otherwise occur if the fuel tank pressure were lowered). A fuel tank pressure transducer (FTPT) 120, or fuel tank pressure sensor, may be included between the fuel tank 20 and canister 22, to provide an estimate of a fuel tank pressure, and for engine-off leak detection. The fuel tank pressure transducer may alternately be located in vapor recovery line 31, purge line 28, vent line 27, or canister 22, without affecting its engine-off leak detection ability.

Fuel vapor canister 22 may be filled with an appropriate adsorbent, and may be configured to temporarily trap fuel vapors (including vaporized hydrocarbons) during fuel tank refilling operations, "running loss" (that is, fuel vaporized during vehicle operation), and other diurnal conditions. In one example, the adsorbent used is activated charcoal. Canister 22 may further include a vent line 27 which may route gases out of the canister 22 to the atmosphere when storing, or trapping, fuel vapors from fuel system 18. Vent line 27 may also allow fresh air to be drawn into canister 22 when purging stored fuel vapors from fuel system 18 to engine intake 23 via purge line 28 and purge valve 112. While this example shows vent line 27 communicating with fresh, unheated air, various modifications may also be used. Flow of air and vapors between fuel vapor canister 22 and the atmosphere may be regulated by the operation of a canister vent valve 108.

Canister vent valve 108 may be a three-way or three-position valve. For example valve 108 may be adjustable between an unpowered or depowered state, a first powered state, and a second powered state. For example, vent valve 108 may be controlled by operation of one or more solenoids (not shown) to control a state of the valve. The depowered state may be a valve position of the valve when no current is supplied to the valve so that the valve is normally in the depowered state until a current is supplied to the valve to adjust it to the first or second powered state. For example, the depowered state of the vent valve 108 may provide a first amount of venting to the canister 22. This depowered state of the vent valve may restrict the amount of venting provided to the canister by a first amount and may correspond to a valve position which is orificed, restricted, or partially closed.

The first powered state may provide a second amount of venting to the canister, where the second amount of venting is greater than the first amount of venting provided to the canister when the valve is in the depowered state. For example, in response to certain conditions, a first amount of current may be supplied to the vent valve to adjust the vent valve to the first powered state. In some examples, the first powered state may be a fully opened valve position so that an amount of restriction of venting provided to the canister in the first powered state is less than the amount of restriction provided to the canister when the vent is in the depowered state. This first powered, or fully open state, may be used during purging conditions as described in more detail below with regard to FIG. 2.

The second powered state may provide a third amount of venting to the canister, where the third amount of venting is less than the first amount of venting provided to the canister when the valve is in the depowered state. For example, in response to certain conditions, a second amount of current, different from the first amount of current used in the first powered state, may be supplied to the vent valve to adjust the vent valve to the second powered state. In some examples, the second powered state may be a fully closed valve position so that there is substantially no venting provided to the canister. This second powered, or fully closed state, may be used during monitoring conditions, e.g., during leak testing, to completely seal off the fuel vapor system from the atmosphere as described in more detail below with regard to FIG. 2.

In order to reduce vapor generation and more effectively utilize vapor storage capacity, the fresh air vent valve 108 may be restricted during diurnal events, such as during refueling, to a valve position corresponding to the depowered state. In this state the valve may be partially open so that an amount of valve opening in this depowered position is less than an amount of valve opening in the first powered state. By restricting the fresh air path at the canister vent during diurnal events, positive pressure may build in the evaporative emission system leading to a reduction in vapor generation. Also, by restricting the canister vent in the depowered state, vapor may be forced to travel over the canister bed at a slower rate allowing more residence time which allows the canister bed material to bond more vapor in the bed before reaching atmosphere. Because the purge system may be sealed for the canister vent valve, the restricted vent valve position in the depowered state may allow a pressure build in the system, reducing vapor generation rates. As pressure increases, vapor would slowly migrate toward the vent valve and atmosphere but due to the longer transport time across the canister bed, vapor may be stored more effectively in the bed before reaching atmosphere.

During purge monitoring conditions, the vent valve may be forced closed by adjusting the valve to the second powered state and pressure and temperature changes may be monitored to check for leaks or other sources of degradation in the sealed system. Further, during purging conditions, the vent valve may be forced open by adjusting the valve to the first powered state to permit air to be drawn into the canister from the atmosphere to purge fuel from the canister and provide the purged fuel to an intake of the engine.

Such an approach may reduce costs associated with a non-integrated refueling only (NIRCOS) system by using existing evaporative emission hardware, e.g., using common plastic fuel tanks rather than metal fuel tanks and using standard valves rather than costly fuel tank isolation valves (FTIV). Further, the canister vent valve position in the depowered state can be adjusted to allow a maximum pressure build that existing hardware can handle rather than increasing thickness of the fuel tank or other components in the system.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as pressure, temperature, air/fuel ratio, and composition sensors may be coupled to various locations in the vehicle system 6, as discussed in more detail herein. As another example, the actuators may include fuel injector 66, valve 112, and throttle 62. The control system 14 may include a controller 12. The controller may receive input data from the various sensors, process the input data, and trigger the actuators in response to the processed input data based on instruction or code programmed therein corresponding to one or more routines. An example control routine is described below with regard to FIG. 2.

FIG. 2 shows an example method 200 for operating an engine with a fuel vapor recovery system by adjusting the state of a three-position canister vent valve, such as valve 108 described above. In particular, the canister vent valve may be selectively adjusted so that during a diurnal condition a first amount of venting is provided to the fuel vapor canister, during a purge condition a second amount, greater than the first amount, of venting is provided to the fuel vapor canister, and during a monitoring condition a third amount of venting is proved to the canister, where the third amount is less than the first amount.

At 202, method 200 includes determining if diurnal conditions are present. Diurnal conditions may be engine or vehicle operating conditions wherein temperature changes cause fuel to evaporate from the fuel tank at increased rates. For example, diurnal condition may include a refueling event or other engine off conditions where ambient temperatures increase. For example, a diurnal condition may occur while the engine is not running. Determination of a diurnal condition may be based on various sensors in the vehicle system, e.g., pressure and temperature sensors used to determine an amount of fuel evaporation from the fuel tank. For example, if an amount of evaporation of fuel in the fuel tank is determined to be above a threshold value then diurnal conditions may be present. If diurnal conditions are present at 202, method 200 proceeds to 204.

At 204, method 200 includes providing a first amount of venting to the fuel vapor canister. For example, vent valve 108 may be adjusted to restrict an amount of fuel vapor canister venting by a first amount. As remarked above, vent valve 108 may include three different positions corresponding to a depowered state, and first and second powered states. When current is not supplied to vent valve 108, the valve may be in the depowered or unpowered state so that the valve is partially closed and restricts fresh air venting to the canister. Thus, at 206, method 200 may include adjusting the vent valve to a depowered state or maintaining the vent valve in the depowered state. In some examples, this may include removing or discontinuing any current or actuation source supplied to the valve so that it returns to its depowered, restricted state.

At 208, method 200 includes closing a purge valve or maintaining the purge valve closed. For example, purge valve 112 may be a normally closed valve and may be closed or maintained closed during diurnal events. As described below, in some examples purge valve 112 may remain closed until a purge event is initiated.

If diurnal conditions are not met at 202, then method 200 proceeds to 210 to determine if purging conditions are met. Purging conditions may be confirmed based on various engine and vehicle operating parameters, including an amount of hydrocarbons stored in canister 22 being greater than a threshold, the temperature of emission control device 70 being greater than a threshold, a temperature of canister 22, fuel temperature, the number of engine starts since the last purge operation (such as the number of starts being greater than a threshold), a duration elapsed since the last purge operation, fuel properties, and various others. As another example, purging could occur for an onboard diagnostics (OBD) hardware check, or altitude adjustment for engine operation. If purging conditions are met at 210, then method 200 proceeds to 212.

At 212, method 200 includes initiating a purge event. Initiating a fuel vapor purging event may include sending a request to open the vent valve coupled to the fuel vapor canister and maintaining the vent valve open at a set-point throughout a duration of the fuel vapor purging event. For example, a controller may open canister vent valve 108 (for example, by energizing a canister vent solenoid) to a fixed open position corresponding to the first powered state and maintain the vent valve open at the fixed position without any adjustments to the position of the vent valve throughout the entire fuel vapor purging event. By maintaining the vent valve open in a fixed position through a fuel vapor purging event, fresh air may be drawn in through vent line 27 to purge fuel vapor stored in the fuel vapor canister.

However, in other examples, as described below, the vent valve may be first adjusted to the depowered state so that canister venting is restricted immediately after initiating the purge. For example, by provided an increased flow restriction at purge initiation, the purge valve 112 in purge conduit 28 may be opened more quickly and then, as described below, after the purge valve 112 is fully open, the vent valve may be adjusted to the first powered state to fully open the canister vent 108.

In some examples, initiating a purge event may also include calculating a purge vacuum for a desired purge rate. For example, air pressure and air temperature in conduit 28 or in intake manifold 44 may be determined so that component adjustment may be performed to achieve a desired purge rate. For example, controller 12 may adjust purge valve 112 to achieve the desired purge flow rate.

At 214, method 200 may include providing the first amount of venting to the canister after initiating the purge event. For example, at 216, method 200 may include adjusting the vent valve to the depowered state so that the vent valve restricts air flow drawn through the canister from the atmosphere as the purge valve is adjusted from a closed position to an open position.

At 218, method 200 includes opening the purge valve or maintaining the purge valve open. For example, while the vent valve 108 is restricting air drawn through canister 22, the purge valve may be adjusted at a rate based on the amount of restriction provided by vent valve 108. The vent valve may remain in the restricted position until the purge valve 112 is fully open or in its final position for purging, where the final position may be based on a desired purge rate.

At 220, method 200 includes providing a second amount of venting to the fuel vapor canister after the purge valve is adjusted to its final position. For example, at 222, method 200 may include adjusting the vent valve to a first powered state. Here, the second amount of venting is greater than the first amount of venting provided to the canister by the vent in the depowered state. The increased second amount of venting may correspond to the first powered state of vent valve 108 and may be a fully open valve position. The vent valve may be adjusted from the depowered state to the fully open position after a duration following opening the purge valve. For example, the duration may be based on the time it takes the purge valve to be adjusted to its final opened position.

At 224, method 200 includes determining if the canister is purged. For example, this may include determining if an amount of fuel vapor being purged from the canister falls below a threshold level. The amount of fuel vapor may be a concentration of fuel in the purge flow (fuel fraction), a fuel mass flow rate, etc. For example, if the amount of fuel vapor being purged in the canister is less than the threshold level of if an amount of fuel stored in the canister is less than a threshold then the purge event may be terminated. If the canister is not purged at 224, method 200 includes maintaining the purge valve open and providing the second amount of venting to continue purging the canister.

However, if the canister is purged at 224, or if the purge is complete, then method 200 proceeds to 226. At 226, method 200 includes closing the purge valve, and, at 228, method 200 includes providing the first amount of venting to the canister. For example, at 230, method includes adjusting the vent valve to the depowered state. Additionally, a fuel injection to the engine may be adjusted during a transition between purging and non-purging conditions. The adjustment may include, for example, adjusting fuel injection responsive to the purge flow during purging conditions, and adjusting fuel injection responsive to the air flow during non-purging conditions.

If purging conditions are not met at 210, then method 200 proceeds to 232 to determine if monitoring conditions are met. For example, monitoring conditions may include leak testing conditions and may be based on an engine off or engine start condition. For example, leak tests may be scheduled to be periodically performed in response to engine off events. During monitoring conditions, the evaporative emission system may be sealed off from the atmosphere and monitored for leaks or other sources of degradation. If monitoring conditions are met at 232, then method 200 proceeds to 234.

At 234, method 200 includes providing a third amount of venting to the canister. For example, during a monitoring condition a third amount of venting may be provided to the canister, where the third amount is less than the first amount of venting provided by the vent valve in the depowered state. Thus, at 236, method 200 includes adjusting the vent valve to a second powered state to adjust the vent valve to a powered closed position to seal off the canister from the atmosphere so that no canister venting is present during monitoring. Further, at 238, method 200 includes closing the purge valve or maintaining the purge valve closed.

At 240, method 200 includes monitoring pressure changes in the evaporative emission control system to determine whether a leak is present or whether other degradation sources are present in the system. At 242, method 200 includes determining if the monitor has been completed. If the monitor has not been completed at 242, then method 200 continues to monitor pressure changes at 240. However, if the monitor has been completed at 242, then method 200 proceeds to 244. At 244, method 200 includes providing the first amount of venting to the canister. For example, at 246, method 200 may include adjusting the vent valve to the depowered state so that the vent valve is again partially opened in a restricted position.

FIG. 3 shows example graphs of operating conditions of a vent valve and purge valve during diurnal, purging, and monitoring conditions. In particular, at 302, FIG. 3 shows a graph indicating a state of canister vent valve 108 during diurnal, monitor, and purge conditions. At 302, the state labeled "0" corresponds to the depowered valve state where the valve is partially open, the state labeled "1" corresponds to the first powered valve state where the valve is fully open, and the state labeled "2" corresponds to the second powered valve state where the valve is fully closed. At 304, FIG. 3 shows a graph indicating the position of purge valve 112, either open or closed, during diurnal, monitor, and purge conditions.

Before time t1 a diurnal condition is present and the purge valve is closed and the vent valve is in the depowered state providing a restricted amount of ventilation to the fuel vapor canister. For example, the diurnal state may be a refueling event while the engine is not running. At t1, a monitoring condition begins, e.g., a leak test may be initiated while the engine is off. Thus, at t1, the vent valve is adjusted to the second powered state to fully close the vent valve and discontinue ventilation provided to the canister. Here, the purge valve remains closed and the system is monitored during the monitor condition from time t1 to time t2 to detect leaks in the system.

At time t2, the monitor condition ends and a second diurnal condition begins. For example, the engine may remain off at time t2 and ambient temperatures may increase. Thus, at time t2, power to the vent valve is removed so that vent valve is adjusted to the depowered state to provide restricted fuel vapor canister venting until time t3 when a purge event is initiated. For example, at time t3 the engine may be running and an amount of fuel vapor stored in the canister may be greater than a threshold value causing a purge event to be initiated. Thus, the purge valve may be commanded to open at time t3 and the vent valve may remain in the depowered state for a duration from time t3 to time t4 while the purge valve opens. At time t4, the vent valve may be adjusted to the first powered state so that it is in a fully opened venting position so that the fuel vapor canister can be purged. At time t5, the purging event ends and a third diurnal condition begins. Thus, at time t5, power is removed from the vent so that the vent returns to its depowered state and the purge valve is again closed.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A method for an engine with a fuel vapor recovery system, comprising:
   during a diurnal condition, providing a first amount of venting to a fuel vapor canister;
   during a purge condition, providing a second amount of venting to the fuel vapor canister, where the second amount is greater than the first amount; and
   in response to a purge event, adjusting a canister vent valve to provide the first amount of venting to the fuel vapor canister and then opening a purge valve and adjusting the canister vent valve to provide the second amount of venting to the fuel vapor canister after a duration following opening the purge valve.

2. The method of claim 1, further comprising, during a monitoring condition, providing a third amount of venting to the canister, where the third amount is less than the first amount.

3. The method of claim 2, wherein the monitoring condition is a leak testing event and wherein the third amount of venting is no venting.

4. The method of claim 1, wherein providing the first amount of venting to the fuel vapor canister includes adjusting a vent valve to a depowered state, and wherein providing the second amount of venting to the fuel vapor canister includes adjusting the vent valve to a first powered state.

5. The method of claim 4, further comprising adjusting the vent valve to a powered closed position during a monitoring condition.

6. The method of claim 1, further comprising opening the purge valve while providing the second amount of venting to the fuel vapor canister during the purge condition.

7. The method of claim 1, further comprising closing or maintaining closed a purge valve while providing the first amount of venting to the fuel vapor canister during the diurnal condition.

8. The method of claim 1, wherein the diurnal condition is a refueling event.

9. A system for an engine with a fuel vapor recovery system, comprising:
   a fuel vapor canister;
   an atmosphere vent coupled to the fuel vapor canister;

a vent valve disposed in the atmosphere vent, the vent valve adjustable between an unpowered state, a first powered state, and a second powered state;

a purge conduit coupled to the fuel vapor canister and an intake of the engine; and a controller configured to:
during a diurnal condition, adjust the vent valve to the unpowered state to provide a first amount of venting to the fuel vapor canister;
during a purge condition, adjust the vent valve to the first powered state to provide a second amount of venting to the fuel vapor canister, where the second amount is greater than the first amount; and
during a monitoring condition, adjust the vent valve to the second powered state to close the canister vent.

10. The system of claim 9, further comprising a purge valve disposed in the purge conduit, and wherein the controller is further configured to close the purge valve during the diurnal and monitoring conditions and open the purge valve during the purging condition.

11. The system of claim 10, wherein the controller is further configured to, in response to a purge event, adjust the canister vent valve to the unpowered state to provide the first amount of venting to the fuel vapor canister and then open the purge valve and adjust the canister vent valve to the first powered state to provide the second amount of venting to the canister after a duration following opening the purge valve.

12. The system of claim 10, wherein adjusting the vent valve to the first powered state comprises providing a first amount of current to the vent valve, adjusting the vent valve to the second powered state comprises providing a second amount of current to the vent valve, and adjusting the vent valve to the unpowered state comprises discontinuing a current supply to the vent valve.

13. A method for an engine with a fuel vapor recovery system, comprising:
adjusting a three-position canister vent valve to a partially open state during a diurnal condition when the engine is off to restrict an amount of fuel vapor canister venting by a first amount;
adjusting the canister vent valve to a fully open state during a purge condition when the engine is running to restrict an amount of fuel vapor canister venting by a second amount, where the second amount is less than the first amount; and
adjusting the canister vent valve to a fully closed state during a monitoring condition to discontinue fuel vapor canister venting.

14. The method of claim 13, wherein the monitoring condition is a leak testing event and the method further comprises closing a purge valve during the leak testing event.

15. The method of claim 13, wherein adjusting the canister vent valve to the partially open state includes adjusting the canister vent valve to a depowered state, wherein adjusting the canister vent valve to the fully open state includes adjusting the canister vent valve to a first powered state, and wherein adjusting the canister vent valve to the fully closed state includes the canister vent valve to a second powered state.

16. The method of claim 13, further comprising, in response to a purge event, adjusting the canister vent valve to restrict the amount of fuel vapor canister venting by the first amount and then opening a purge valve and adjusting the canister vent valve to restrict the amount of fuel vapor canister venting by the second amount after a duration following opening the purge valve.

17. The method of claim 13, further comprising opening a purge valve while restricting the amount of fuel vapor canister venting by the second amount during the purge condition.

18. The method of claim 13, further comprising closing or maintaining closed a purge valve while restricting the amount of fuel vapor canister venting by the first amount during the diurnal condition.

19. The method of claim 13, wherein the diurnal condition occurs during a refueling event while the engine is not running.

* * * * *